United States Patent [19]
Chimento, Jr. et al.

[11] Patent Number: 5,434,848
[45] Date of Patent: Jul. 18, 1995

[54] TRAFFIC MANAGEMENT IN PACKET COMMUNICATIONS NETWORKS

[75] Inventors: Philip F. Chimento, Jr.; Vidyadhar G. Kulkarni; Levent Gun, all of Durham, N.C.

[73] Assignee: International Business Machines Corporation, Armonk, N.Y.

[21] Appl. No.: 281,947

[22] Filed: Jul. 28, 1994

[51] Int. Cl.6 .............................................. H04J 3/14
[52] U.S. Cl. .................... 370/17; 370/60.1; 370/79; 370/85.6
[58] Field of Search .............. 370/17, 60, 60.1, 79, 370/85.6, 94.1, 94.2

[56] References Cited

U.S. PATENT DOCUMENTS

| | | | |
|---|---|---|---|
| 4,984,264 | 1/1991 | Katsube | 370/60 X |
| 5,233,604 | 8/1993 | Aahmadi et al. | 370/60 |
| 5,267,232 | 11/1993 | Katsube et al. | 370/17 |
| 5,289,462 | 2/1994 | Ahmadi et al. | 370/60.1 |
| 5,311,513 | 5/1994 | Ahmadi et al. | 370/85.4 |
| 5,347,511 | 9/1994 | Gun | 370/54 |

Primary Examiner—Douglas W. Olms
Assistant Examiner—Russell W. Blum
Attorney, Agent, or Firm—Robert O. Nimtz

[57] ABSTRACT

A packet communications network is adapted for efficiently handling of multi-priority traffic (such as multimedia traffic) by defining an access algorithm that not only ensures the requested loss probabilities for both priorities of traffic, but also optimizes the bandwidth required to carry both priority classes. A buffer having a properly sized occupancy threshold admits high priority traffic if there is room in the buffer, but admits lower priority traffic only if the buffer occupancy is below the occupancy threshold. The resulting consolidated multi-priority traffic can then be characterized by an effective bandwidth which increases the packet network capacity substantially. The multi-priority access mechanisms require little or no changes in the prior art access mechanisms and utilize pre-existing leaky bucket, route selection and link metric mechanisms of the prior art.

18 Claims, 5 Drawing Sheets

TRAFFIC MANAGEMENT IN PACKET COMMUNICATIONS NETWORKS

TECHNICAL FIELD

This invention relates to packet communications networks and, more particularly, to the management of multiple priority traffic in such networks.

BACKGROUND OF THE INVENTION

Digital data to be transmitted on a packet communications network can be characterized quite accurately by a very few statistical parameters. These parameters are normally used to determine if new traffic can be added to the transmission links of the network. These parameters, which together form a vector representation of the source traffic, could, for example, include the mean and variance of the bit rate and the effective bandwidth for the traffic. In the U.S. Pat. No. 5,289,462, issued Feb. 22, 1994, there is disclosed a traffic control system for packet communications networks utilizing an easily constructed and readily updated traffic load vector for representing the existing traffic load on each link of the network. A computationally efficient algorithm for updating these traffic load vectors is also disclosed which allows such updating in real time as connections are added to or removed from the network. In particular, each connection on the network is represented by a vector. The sum of all of the individual vectors representing all of the connections on a transmission link represents the total traffic on that transmission link. Each request for a connection or a disconnection is accompanied by a connection vector which can merely be added to or subtracted from the link load vector. New traffic is admitted to a transmission link only if sufficient capacity remains to carry that new traffic. All traffic seeking access to the network is assumed to have a single priority class, where priority class implies a particular guaranteed level of data loss probability.

In order to ensure that the traffic offered by each input connection remains consistent with the originally assumed statistical vector for that traffic, a so-called "leaky bucket" mechanism is provided to control the access of traffic to the network at the access point. Such a leaky bucket mechanism is transparent to the traffic so long as that traffic remains within the originally assumed statistical traffic parameters. If the incoming traffic exceeds these assumed values, the leaky bucket mechanism controls admission of the traffic to the network so as to enforce the original assumptions (until a new set of assumptions can be negotiated). One type of leaky bucket mechanism is described in the co-pending application Ser. No. 07/943,097, filed Sep. 10, 1992, now U.S. Pat. No. 5,511,513, and assigned to applicants' assignee.

Many types of digital traffic require two or more classes of traffic priorities for proper operation. For example, K. Lindberger discusses such a system in "Analytical Methods for Traffic Problems with Statistical Multiplexing on ATM Networks," *Proceedings of the 13th International Teletraffic Congress*, 1991. Multimedia traffic, in general, has the property that a single data source produces multiple data streams having different priority classes. Real time video data, for example, requires a much higher priority class than does the audio signal accompanying the video traffic. The traffic management system of the afore-mentioned patent application Ser. No. 07/943,097, now U.S. Pat. No. 5,311,513, unfortunately, is capable of handling only one priority class of traffic, and hence is unsuitable for multiple priority class traffic.

SUMMARY OF THE INVENTION

In accordance with the illustrative embodiment of the present invention, the traffic management system of the above-identified patent application is modified to handle data streams including data with a plurality of traffic priority classes to be transmitted from the same source. More particularly, if a data stream including two classes of traffic are offered to a buffer at the input access to the network, the higher priority packets are always admitted into the buffer so long as there is room for those high priority packets. Lower priority packets, on the other hand, are admitted to the buffer only if the buffer occupancy does not exceed a threshold value. In further accord with the present invention, the threshold for admittance of the lower priority packets is calculated so as to enforce the desired probability of loss for both priority classes and, at the same time, minimize the bandwidth requirements for the combined stream of two-priority traffic. More particularly, the buffer size and threshold are selected so as to satisfy both quality of service loss probability requirements while simultaneously minimizing the channel bandwidth which must be reserved for carrying the multiple-priority traffic.

In accordance with one feature of the present invention, the determination of an appropriate lower priority class buffer admission threshold leads to the definition of an "effective bandwidth" for the multiple-priority data stream which comprises a better characterization of the traffic than the directly calculated bandwidth capacity. As taught in U.S. Pat. No. 5,289,462, an effective bandwidth calculated to ensure the satisfaction of a desired level of loss probabilities provides a better representation of the traffic which permits a more efficient utilization of the transmission facilities of the network, all as taught in the afore-mentioned patent.

A more advantage of the present invention is the ease of implementation of the multiple-priority data management algorithm since the necessary control parameters are easily calculated. In addition, the resulting management control system is a readily implemented extension of the prior art single priority mechanism requiring few changes and very little additional computation complexity.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
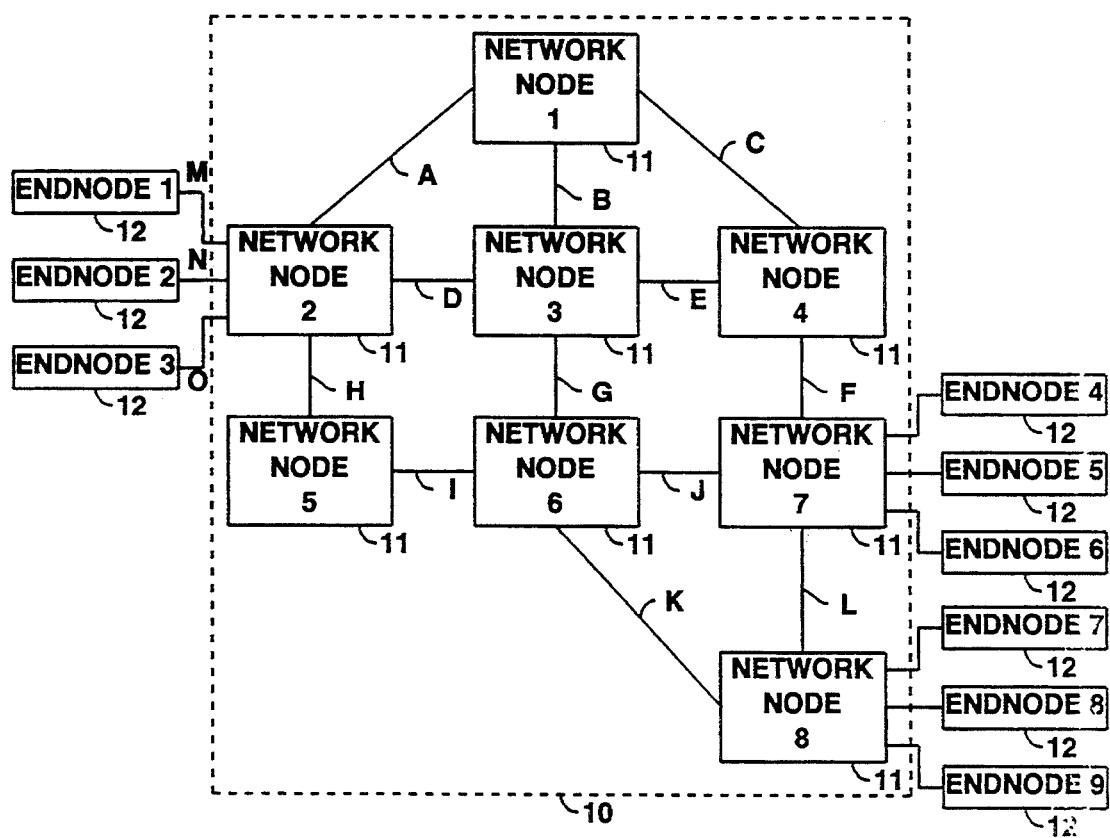
FIG. 1 shows a general block diagram of packet transmission network of the type in which the multiple-priority traffic management system of the present invention might find use.

Referring more particularly to FIG. 1, there is shown a general block diagram of a packet transmission network 10 comprising eight network nodes 11 numbered 1 through 8. Each of the network nodes 11 is linked to others of the network nodes 11 by one or more communication links A through L. Each such communication link may be either a permanent connection or a selectively enabled (dial-up) connection. Any or all of the network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as decision points within the node. The network nodes 11 each comprise one or more decision points within the node, at which decision points incoming data packets are selectively routed on one or more of the outgoing communication links terminated within that node or at another node. Such routing decisions are made in response to information in the header of the data packet. The network node also provides ancillary services such as the calculation of routes or paths between terminal nodes, providing access control to packets entering the network at that node, and providing directory services and maintenance of network topology data bases used to support route calculations.

Each of end nodes 12 comprises either a source of digital data to be transmitted to another end nodes, a utilization device for consuming digital data received from another end node, a utilization device for consuming digital data received from another end node, or both. Users of the packet communications network 10 of FIG. 1 utilize an end node device 12 connected to the local network node 11 for access to the packet network 10. The local network node 11 translates the user's data into packets formatted appropriately for transmission on the packet network of FIG. 1 and generates the header which is used to route the packets through the network 10. In accordance with the present invention, some of the end nodes 12 are connected to sources of two or more priority data which require transmission on the network of FIG. 1 to destinations also connected to the network of FIG. 1 at remote end nodes.

In order to transmit packets on the network of FIG. 1, it is necessary to calculate a feasible path or route through the network from the source node to the destination node for the transmission of such packets. To avoid overload on any of the links in this route, the route is calculated in accordance with an algorithm that insures that adequate bandwidth is available on every link for each new connection. One such algorithm is disclosed in the co-pending application, Ser. No. 07/874,917, filed Apr. 28, 1992, now U.S. Pat. No. 5,233,604, and assigned to applicants' assignee. One such a route is calculated, a connection request message is launched on the network, following the computed route and updating the bandwidth occupancy of each link along the route to reflect the new connection (or denying the new connection if sufficient bandwidth is not available). One such connection request message is shown in FIG. 2.

Figure 2:
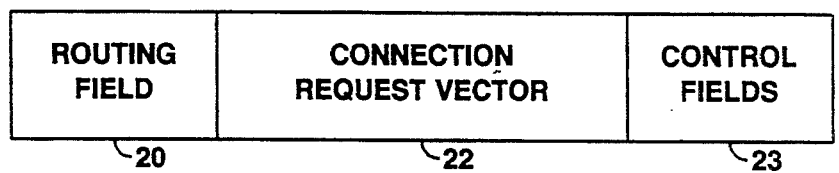
FIG. 2 shows a graphical representation of a connection request message which might be used in the network of FIG. 1 to establish or to take down a particular connection in a multi-priority traffic management system in accordance with the present invention.

In FIG. 2 there is shown a graphical representation of a connection request message to be launched from a source node in the network of FIG. 1 to a destination node in the network along a pre-calculated route. The connection message of FIG. 2 comprises a routing field 20 which includes the information necessary to transmit the connection message along the pre-calculated route. Also included in the connection request message of FIG. 2 is a connection request vector 22 which characterizes the important statistical characteristics of the new packet source and which allows this new source to be tested for statistical multiplexing with the previously existing signals on each link of the route. Typically, this connection request vector includes the mean of the aggregate bit rate for the source, the variance of that bit rate from that source, and the equivalent bandwidth required for the new connection. The values in this connection request vector are used to test each link of the route to determine if the new connection will actually be supported by the links, and to update, separately for each link, the link occupancy vector to reflect the addition of the new connection. If the link occupancy has changed since the route was calculated, the connection may be rejected at any node along the route, and the source node notified of the rejection. Finally, the control fields 23 include additional information used in establishing the connection, but which is not pertinent to the present invention and will not be further discussed here. Note that when a connection is to be taken down, a connection removal message having the same format as FIG. 2 is transmitted along the route of the connection to be removed. The link occupancy can then be updated to reflect the removal of this connection by subtracting the vector for the removed connection.

Figure 3:
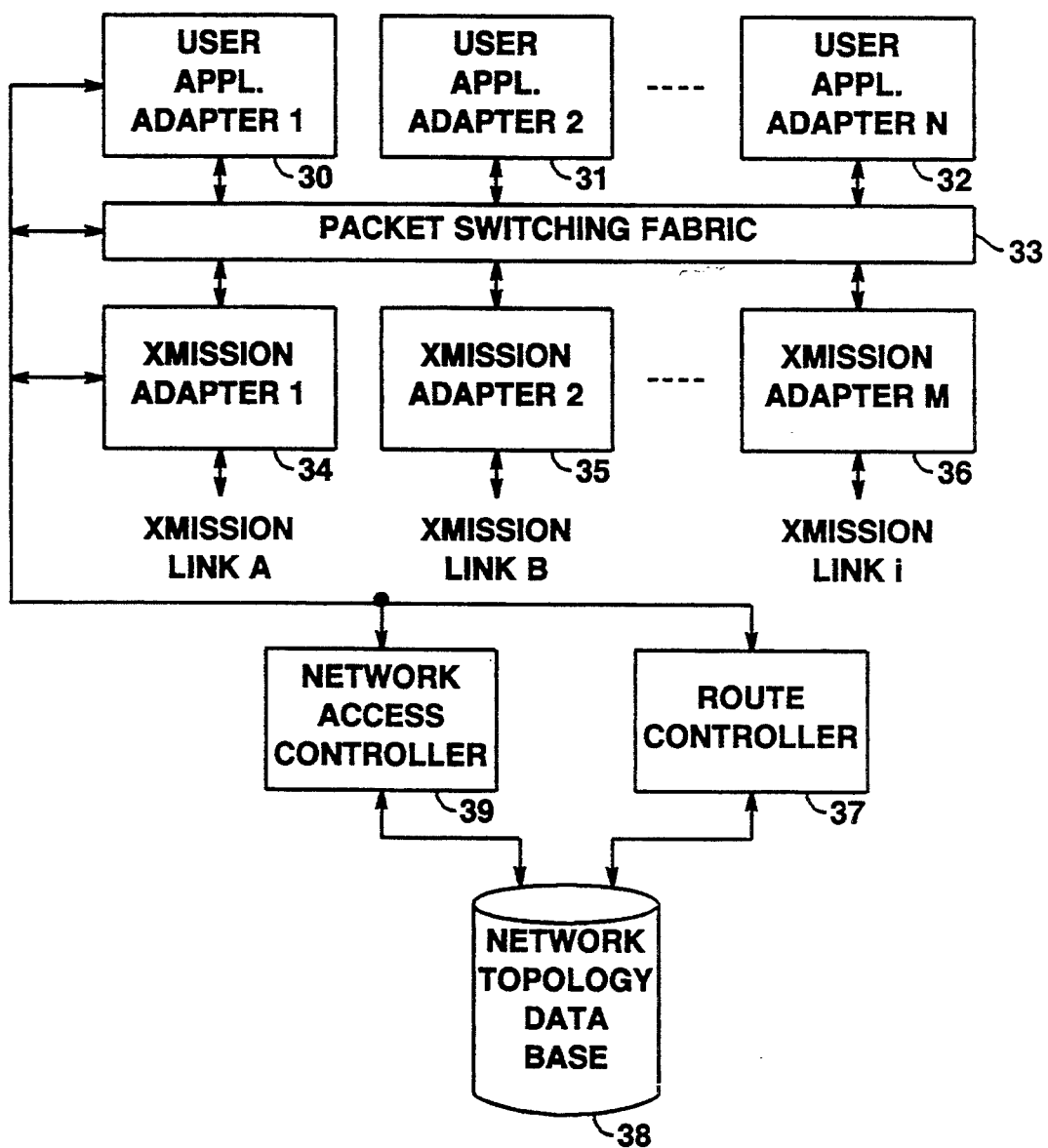
FIG. 3 shows a more detailed block diagram of a typical decision point in the network of FIG. 1 showing the access and packet-forwarding switching facilities used in the traffic management system of the present invention.

In FIG. 3 there is shown a general block diagram of a typical packet network decision point such as is found in the network nodes 11 of FIG. 1. The decision point of FIG. 3 comprises a high speed packet switching fabric 33 onto which packets arriving at the decision point are entered. Such packets arrive over transmission lines via transmission adapters 34, 35, . . . , 36, or originate in user applications in end nodes via application adapters 30, 31, . . . , 32. It should be noted that one or more of the transmission adapters 34–36 can be connected to an intra-node transmission link connected to yet other packet switching fabrics similar to fabric 33, thereby expanding the switching capacity of the node. The decision point of FIG. 3 thus serves to connect the packets arriving at the decision point to a local user (for end nodes) or to a transmission link leaving the decision point (for network nodes and end nodes). The adapters 30–32 and 34–36 each include queuing circuits for queuing packets prior to or subsequent to switching in fabric 33. In accordance with the present invention, these queuing circuits in adapters 34–36 are used to control the access of multiple priority traffic to the transmission links of FIG. 1.

A route controller 37 in the decision point of FIG. 3 is used to calculate optimum routes through the network for packets originating at one of the user application adapters 30–32 in the decision point. Network access controller 39 is used to control the access of user data, including user multi-priority signals, to the network of FIG. 1 and to regulate the launching of packets onto the network whenever the transient bit rate of any connection exceeds the values assumed in making the original connection. Both route controller 37 and control 39 utilize the vector representation of the new connection (field 22 of FIG. 2) in calculating new routes or for controlling access of signals on previously assigned routes. In addition, route controller 37 utilizes the link metric vectors representing current traffic on each link of the network, stored in topology data base 38, to calculate the new connection route through the network. Network topology data base 38 contains information about all of the nodes and transmission links of the network of FIG. 1 which information is necessary for controller 37 to operate properly.

The controllers 37 and 39 of FIG. 3 may comprise discrete digital circuitry or may preferably comprise properly programmed general purpose digital computer circuits. Such a programmed computer can be used to generate and launch connection request messages (FIG. 2) used to set up a connection and to generate headers for data packets originating at user applications in the decision point of FIG. 3 or connected directly thereto. Similarly, the computer can also be used to calculate feasible routes for new connections and to calculate the necessary controls to regulate access to the network in order to prevent congestion. The information in data base 38 is updated when new links are activated or old links taken down, when new nodes are added to the network or removed from the network, and when link loads change due to the addition or removal of new connections. Such information originates at the network node to which the resources are attached and is exchanged with all other nodes to assure up-to-date topological information needed for route and access control operations. Such data can be carried throughout the network on packets very similar to the information packets exchanged between end users of the network.

The incoming transmission links to the packet decision point of FIG. 3 may comprise links from local end nodes such as end nodes 12 of FIG. 1, or links from adjacent network nodes 11 of FIG. 1. In any case, the decision point of FIG. 3 operates in the same fashion to receive each data packet and forward it on to another local or remote decision point as dictated by the information in the packet header. The packet network of FIG. 1 thus operates to enable communication between any two end nodes of FIG. 1 without dedicating any transmission or node facilities to that communication path except for the duration of a single packet. In this way, the utilization of the communications facilities of the packet network is optimized to carry significantly more traffic than would be possible with dedicated transmission links for each communication path.

Figure 4:
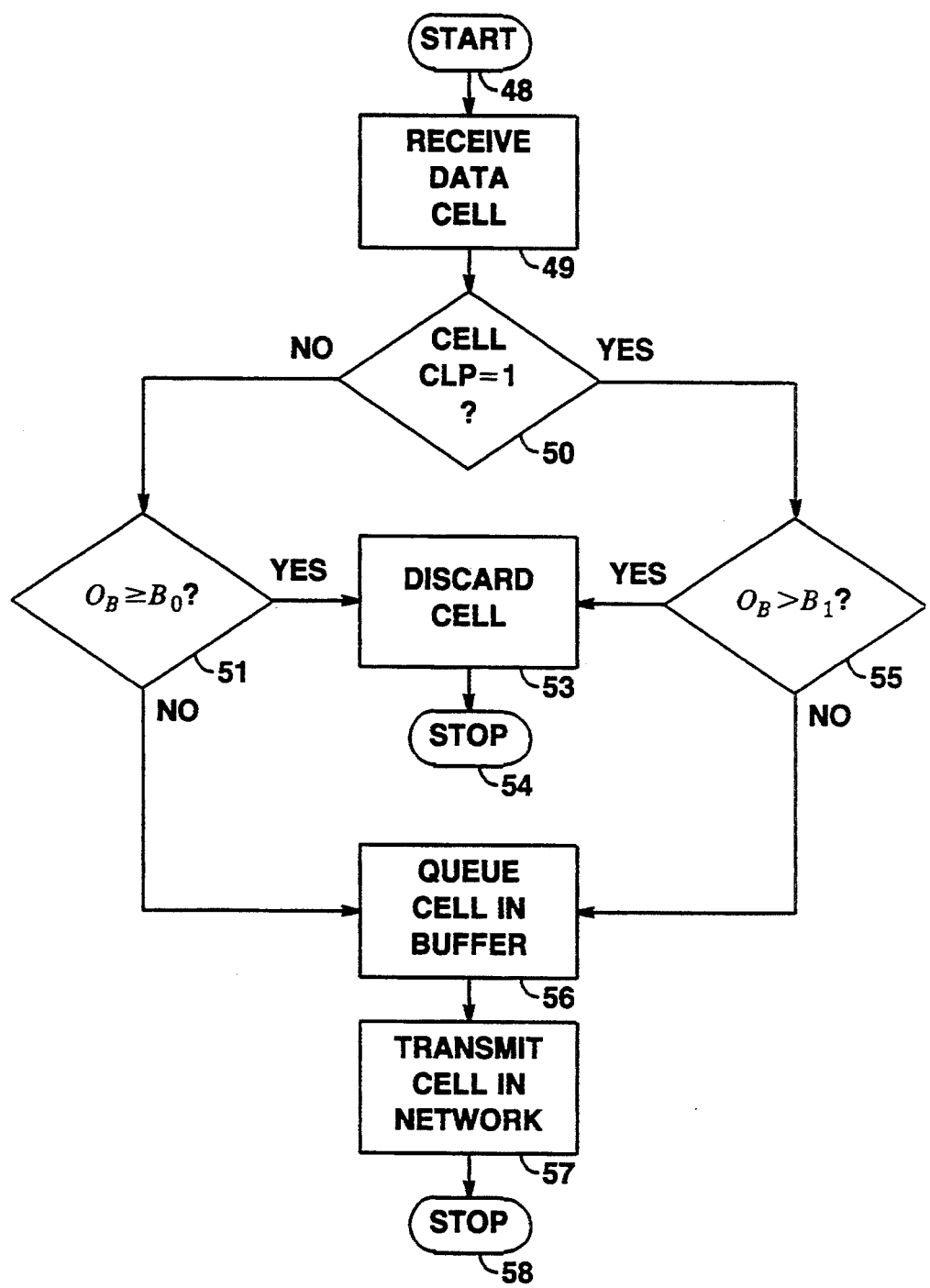
FIG. 4 shows a detailed flow chart of the process for the handling of two-priority data from a data source by the transmission adaptors of FIG. 2 in accordance with the present invention.

In FIG. 4 there is shown a flow chart of the process for admitting multi-priority traffic into transmission adaptor queues 34–36 of the decision point of FIG. 3 in accordance with the present invention. Assuming for the purposes of simplicity that packets from a two-priority signal source, such as a multimedia signal source, arrive at one of the adapters 30–32 of FIG. 3 and are switched to one of the adapters 34–36 for entrance into the network of FIG. 1. Starting at start box 48, box 49 is entered where the data packet or cell is received. Decision box 50 is then entered where it is determined whether or not the cell loss priority (CLP) assigned to this packet is equal to "1." That is, decision box 50 determines whether the arriving packet is a high priority packet or a low priority packet. If the packet or cell is a high priority cell (CLP$\neq$1), decision box 51 is entered to determine whether or not the occupancy of the buffer store is greater than or equal to the size of the buffer store ($O_B \geq B_0$), that is, there room in the buffer store for this packet. If not, box 53 is entered where the cell is discarded and then the process ended in box 54. If, on the other hand, there is room for this packet in the packet store ($O_B < B_0$), box 56 is entered where this packet or cell is queued in the buffer store. In box 57, this cell is transmitted in the network of FIG. 1 when appropriate. The process of FIG. 4 then stops in terminal box 58.

If it is determined in decision box 50 that the packet is a low priority packet (CLP=1), decision box 55 is entered to determine whether or not the occupancy of the buffer stores exceeds a predetermined, calculated threshold $B_1$, i.e., $O_B > B_1$. If the threshold is exceeded, box 53 is entered where the cell is discarded and the process terminated in box 54. If, however, the threshold is not exceeded, box 56 is entered where the cell is queued in the buffer register and, in box 57, transmitted in the network of FIG. 1 when appropriate. The process then terminates in terminal box 58.

It can be seen that the flow chart of FIG. 4 serves to admit high priority cells (CLP=0) from a two-priority traffic source any time there is room for the high priority cell in the buffer. On the other hand, low priority cells (CLP=1) are admitted to the buffer only if the occupancy of the buffer is below a predetermined threshold. The determination of the value of this threshold $B_1$ will be described in detail in connection with the flow chart of FIG. 6. Note, however, that the value of $B_1$ is a function of the parameters of the two-parameter data stream and thus can be calculated prior to the actual transmission of the two-priority data stream and simply supplied to the circuits of FIG. 3.

The traffic from each two-priority data source must be characterized by a connection request vector to be inserted in field 22 of FIG. 2. The calculation of this vector is the subject matter of the present invention and involves the calculation of an "effective bandwidth" which not only carries the two-priority traffic, but also ensures the satisfaction of the desired quality of service for each priority class. The calculation of a minimum value for this effective bandwidth will be described in connection with FIG. 5. The resulting vector can be used, not only to reserve bandwidth on the links in the route to be followed by the two-priority traffic, but which can also be used, as taught in the co-pending application Ser. No. 07/943,097, filed Sep. 10, 1992, now U.S. Pat. No. 5,311,513, and assigned to applicants' assignee, to control congestion in the network.

Before proceeding to the detailed algorithms of FIGS. 5 and 6, the mathematical basis for these algorithms will be discussed. For simplicity, two priority traffic will be considered in the preferred embodiment since ATM multimedia standards have set aside only one bit to determine priority class. There exists a large literature on guaranteeing quality of service for a single priority traffic, including "Equivalent Capacity and its Application to Bandwidth Allocation in High Speed Networks," by R. Guerin, H. Ahamdi and M. Naghshineh, *IEEE Journal of Selected Areas in Communications*, Vol. 9, pages 968–981, 1991. Typically, in single priority traffic, the quality of service is quantified by $P\{X=B_0\} \leq \epsilon$, where X is the steady state buffer content, B is the buffer size and $\epsilon$ is the maximum acceptable probability that a packet will be lost. The value of $\epsilon$ is a small positive constant (typically in the range of $10^{-8}$ to $10^{-10}$). The probability $P\{X=B_0\}$ can be interpreted as the probability that an incoming packet will be lost. The quality of service is thus measured in terms of the fraction of packets lost.

In the region where $B_0$ is large and $\epsilon$ is small (the typical situation), the concept of "effective bandwidth" has been found to be a very useful traffic characterization, as taught by F. P. Kelly in "Effective Bandwidths at Multi-Type Queues," *Queuing Systems*, Vol. 9, pages 5–15, 1991. Effective bandwidth is essentially a quantity that depends upon each source's characteristics and on the parameters $B_0$ and $\epsilon$, and has the property that the quality of service (as represented by $B_0$ and $\epsilon$) is guaranteed for all independent sources that are multiplexed onto a single channel if the sum of the effective bandwidths of the sources is less than the channel capacity. This result holds in the region where $B_0 \to \infty$ and $\epsilon \to 0$ in such a way that $$\log \frac{\epsilon}{B_0}$$

approaches a constant.

For the purposes of this invention, the concept of an effective bandwidth vector for two-priority traffic is introduced, specifically that the quality of service for the two types of packets is given by:

$$P\{X=B_0\} \leq \epsilon_0$$

$$P\{X>B_1\} \leq \epsilon_1$$

where $B_0$ is the buffer size, $B_1$ is the threshold and $\epsilon_0$ and $\epsilon_1$ are small non-negative constants where $0 < \epsilon_0 < \epsilon_1 < 1$. Again, $P\{X>B_1\}$ can be interpreted as the probability that a low priority packet is lost. Typically, $\epsilon_0 \approx 10^{-8}$ to $10^{-10}$ while $\epsilon_1 \approx 10^{-4}$ to $10^{-6}$. An effective bandwidth vector for a multi-priority source can then be defined which is a vector of size k (k priorities, where k=2 for the two priority traffic of the preferred embodiment).

Assume a single Markovian on-off traffic source that stays on for an $\exp(\beta)$ amount of time and off for an $\exp(\alpha)$ amount of time. When the source is on, it produces two types of output: type 0 and type 1 at rates $\lambda_0$ and $\lambda_1$, respectively. When the source is off, no output of any kind is produced. The outputs enter a common infinite capacity buffer that empties at a maximum rate of c. There is a single buffer threshold $B_1$ such that outputs of both types are accepted as long as the buffer content is less than $B_1$ and only output of type 0 is accepted when the buffer content is greater than $B_1$. To be precise, let X(t) be the buffer content at time t and Z(t) be the state of the source (1 if on and 0 if off) at time t. A two-priority data source of this type can be characterized by three parameters $(B_0, B_1, c)$, where c is the channel capacity in bits per second. In the following analysis, it is first assumed that $B_0$, $B_1$, and c are fixed and represent the steady state of the buffer content process. An expression which ensures that this set of parameters satisfies the loss probability quality of service criterion, as represented by $\epsilon_0$ and $\epsilon_1$, is developed. Assuming that $(B_0, B_1)$ are held fixed, the channel capacity c is allowed to vary in order to ensure that the quality of service criteria are satisfied. This leads to an expression for an effective bandwidth vector $[c_0(B_0, B_1), c_1(B_0, B_1)]$ such that if $c \geq c_i(B_0, B_1)$ for $i=0,1$, then the quality of service loss probabilities are satisfied. Then, if only $B_0$ is fixed and $B_1$ and c are allowed to vary, an expression for an optimal $B_1^*$ is obtained that minimizes the channel capacity c required to satisfy the quality of service criterion. Finally, the optimum buffer size expression and the optimal bandwidth allocation expression are solved simultaneously. The buffer size $B_0$ is left as a variable and a delay bound is added to the quality of service criteria. The result is an expression for optimal buffer size and effective channel capacity which meet all of the quality of service requirements.

To begin the analysis, if X(t) is the content of the buffer at time t and if Z(t) is the state of the source of two-priority signals (1 if on and 0 if off) at time t, then $$\frac{d}{dt} X(t) = \begin{cases} [(\lambda_0 + \lambda_1)Z(t)]^+ - c & \text{if } X(t) = 0 \\ (\lambda_0 + \lambda_1)Z(t) - c & \text{if } 0 < X(t) < B_1 \\ \lambda_0 Z(t) - c & \text{if } X(t) \geq B_1 \end{cases} \quad (1)$$

where $[x]^+ = \max\{x,0\}$. The steady state behavior of the $\{X(t), t \geq 0\}$ process depends heavily on the value of the channel capacity c. The relevant regions are listed below:

Region 1: $c \geq \lambda_0 + \lambda_1$. In this case, X(t) decreases with time and eventually reaches zero. Thus, $X(t) \to 0$ with a probability of 1. That is, if the buffer empties faster than it can be filled, the content of the buffer eventually goes to zero.

Region 2: $\lambda_0 + \lambda_1 > c \geq \lambda_0$. In this case, X(t) eventually goes below $B_1$ and never again exceeds it. Thus the steady state distribution of X(t) is concentrated over $[0, B_1]$. That is, if the if the buffer empties faster than the arrival rate of the high priority traffic, but a lower than the arrival rate of the combined high and low priority traffic, the content of the buffer eventually goes blow the threshold and the low priority traffic is never admitted.

Region 3:

$$\lambda_0 > c > \lambda_0 \left( \frac{\alpha}{\alpha + \beta} \right).$$

Note that $$\lambda_0 \left( \frac{\alpha}{\alpha + \beta} \right)$$

is the mean arrival rate of type 0 output. In this case X(t) reaches a proper steady state with distribution over $(0, \infty)$. That is, if the buffer empties slower than the arrival rate of the high priority traffic, but faster than the mean arrival rate of the low priority traffic, the buffer occupancy will vary over the entire possible range. This is the only region which can be exploited to serve the two-priority traffic in a practical fashion.

Region 4:

$$\lambda_0 \left( \frac{\alpha}{\alpha + \beta} \right) \geq c.$$

In this case, $X(t) \to \infty$ with probability 1 as $t \to \infty$. That is, if the buffer empties slower than the mean arrival rate of the low priority traffic, eventually the buffer will be filled and no more traffic will be accepted. It is assumed that the system is operating in Region 3, i.e., $$\lambda_0 > c > \lambda_0 \left( \frac{\alpha}{\alpha + \beta} \right), \quad (2)$$

and the following definition of the steady state probabilities is used:

$$\pi_i(x) = \lim_{t \to \infty} P\{X(t) \leq x, Z(t) = i\}, \quad (3)$$

$$x \geq 0, i = 0, 1.$$

where $\pi(x) = [\pi_0(x), \pi_1(x)]$. The main result of these assumptions (2) and (3) is that the steady state distribution is given by $$\pi(x) = \quad (4)$$

$$\begin{cases} a_1[\beta\ \alpha] + b_1[(\lambda_0 + \lambda_1 - c)\beta\ c\beta]\exp(\delta_1 x) & \text{if } 0 < x < B_1 \\ a_0[\beta\ \alpha] + b_0[(\lambda_0 - c)\beta\ c\beta]\exp(\delta_0 x) & \text{if } x > B_1 \end{cases}$$

where $$\delta_1 = \frac{\alpha}{c} - \frac{\beta}{\lambda_0 + \lambda_1 - c}, \quad (5)$$

$$\delta_0 = \frac{\alpha}{c} - \frac{\beta}{\lambda_0 - c}, \quad (6)$$

and $$a_0 = \frac{1}{\alpha + \beta} \quad (7)$$

$$b_0 = \frac{-e_1}{c\beta e_0} \frac{\alpha}{\alpha + \beta} \frac{c - (\lambda_0 + \lambda_1)\frac{\alpha}{\alpha + \beta}}{c - (\lambda_0 + \lambda_1 e_1)\frac{\alpha}{\alpha + \beta}} \quad (8)$$

$$a_1 = \frac{1}{\alpha + \beta} \frac{c - \lambda_0 \frac{\alpha}{\alpha + \beta}}{c - (\lambda_0 + \lambda_1 e_1)\frac{\alpha}{\alpha + \beta}} \quad (9)$$

$$b_1 = -\frac{\alpha}{c\beta} a_1 \quad (10)$$

where $e_i = \exp(\delta_i B_1)$, $i = 0, 1$.

Note that $\delta_0 < 0$ because of equation (2). The unknown constants in equations (7), (8), (9) and (10) can be determined by the four boundary conditions:

$$\pi_1(0) = 0, \pi_1(B_1^-) = \pi_1(B_1^+). \quad (11)$$

$$\lim_{x \to \infty} \pi_0(x) = \frac{\beta}{\beta + \alpha}, \pi_0(B_1^-) = \pi_0(B_1^+). \quad (12)$$

Substituting equations (11) and (12) in equation (4) and using the relationship $\delta_0 < 0$, the following equations result:

$$\alpha a_1 + c\beta b_1 = 0 \quad (13)$$

$$\beta a_0 = \frac{\beta}{\alpha + \beta} \quad (14)$$

$$\alpha a_1 + c\beta b_1 e_1 = \alpha a_0 + c\beta b_0 e_0 \quad (15)$$

$$\beta a_1 + \beta b_1(\lambda_0 + \lambda_1 - c)e_1 = \beta a_0 + \beta b_0(\lambda_0 - c)e_0 \quad (16)$$

where $e_i = \exp(\delta_i B_1)$, $i = 0, 1$. Equations (13)–(16) can be solved to get equations (7)–(10). Equations (4)–(10) will be used to determine the conditions under which the quality of service can be guaranteed for each priority of output signals.

In a buffer of size $B_0$ with a threshold of $B_1 \leq B_0$, the quality of service requirements are expressed as $$P\{\text{Output of type } i \text{ lost in steady state}\} \leq \epsilon_i, \ i=0,1 \quad (17)$$

where $0 < \epsilon_0 \leq \epsilon_1 < 1$ are pre-determined constants. It can be shown that $$P\{\text{Output of type } i \text{ is lost in steady state}\} \leq G(B_i) = \quad (18)$$

$$\lim_{t \to \infty} P\{X(t) > B_i, Z(t) = 1\}$$

where the probability on the right hand side of equation (18) is computed under the assumption that the buffer size in infinite. Hence, instead of using the inequality of equation (17), the following more conservative inequality can be used:

$$G(B_i) \leq \epsilon_i, \ i=0,1 \quad (19)$$

Using equation (4), the above inequality can be written as:

$$G(B_i) = \frac{\alpha}{\alpha + \beta} - \pi_1(B_i) \leq \epsilon_i, \quad i = 0,1 \quad (20)$$

Substituting from equations (4)–(6):

$$G(B_0) = g(B_1)\exp(\delta_1 B_1 + \delta_0(B_0 - B_1)) \quad (21)$$

and $$G(B_1) = g(B_1)\exp(\delta_1 B_1) \quad (22)$$

where $$g(B_1) = \frac{\alpha}{\alpha + \beta} \frac{c - (\lambda_0 + \lambda_1)\frac{\alpha}{\alpha + \beta}}{c - (\lambda_0 + \lambda_1 \exp(\delta_1 B_1))\frac{\alpha}{\alpha + \beta}} \quad (23)$$

It is necessary, however, to check if the quality of service criterion is satisfied by the $(B_0, B_1, c)$ vector derived above. It can be assumed that $$\frac{\lambda_0}{\lambda_0 + \lambda_1} > \frac{\alpha}{\alpha + \beta} \tag{24}$$

and $$(\lambda_0 + \lambda_1)\frac{\alpha}{\alpha + \beta} < c < \lambda_0. \tag{25}$$

Note that if $\delta_1 B_1 + \delta_0(B_0 - B_1) \leq \log \epsilon_0$, then the quality of service loss probability criterion is satisfied for type 0 traffic, and if $\delta_1 B_1 \leq \log \epsilon_1$, then the quality of service loss probability criterion is satisfied for type 1 traffic. Equation (24) implies that the interval in equation (25) is non-empty. Equation (25) implies that $\delta_1 < 0$ and equation (2) implies that $\delta_0 < 0$. Equation (24) also implies that $g(B_1)$ is bounded above by 1 and is a decreasing function of $B_1$. Hence $$\delta_1 B_1 + \delta_0(B_0 - B_1) \leq \log \epsilon_0 \tag{26}$$

$$\Rightarrow \exp(\delta_1 B_1 + \delta_0(B_0 - B_1)) \leq \epsilon_0$$

$$\Rightarrow g(B_1)\exp(\delta_1 B_1 + \delta_0(B_0 - B_1)) \leq \epsilon_0$$

$$\Rightarrow G(B_0) \leq \epsilon_0$$

which implies that the quality of service criterion for type 0 traffic is satisfied. A similar chain of inferences demonstrates that the quality of service criterion is also satisfied for type 1 traffic. In operation Region 2, where $\lambda_0 \leq c < \lambda_0 + \lambda_1$, the steady state process $X(t)$ remains in the region $[0, B_1]$. Hence, type 0 traffic is never lost and its quality of service requirement is always satisfied. In accordance with single priority finite buffer traffic models, the quality of service requirements of type 1 traffic can also always be satisfied, regardless of the traffic mix.

Assuming that equations (24) and (25) are satisfied, and that the parameters $B_0$ and $B_1$ are fixed, it is desirable to determine the smallest value of the required bandwidth c which will still guarantee the quality of service requirement for both types of traffic. That is Minimize c Subject to: $\delta_1 B_1 \leq \log \epsilon_1,$ (27)

$\delta_1 B_1 + \delta_0(B_0 - B_1) \leq \log \epsilon_0,$ and (28)

$$\lambda_0 \frac{\alpha}{\alpha + \beta} < c < \lambda_0. \tag{29}$$

Let $c = c_0 = C_0(B_0, B_1)$ be the solution to the equation $$\left(\frac{\alpha}{c} - \frac{\beta}{\lambda_0 + \lambda_1 - c}\right) B_1 + \tag{30}$$

$$\left(\frac{\alpha}{c} - \frac{\beta}{\lambda_0 - c}\right)(B_0 - B_1) = \log \epsilon_0$$

and let $c = c_1 = c_1(B_0, B_1)$ be the solution to $$\left(\frac{\alpha}{c} - \frac{\beta}{\lambda_0 + \lambda_1 - c}\right) B_1 = \log \epsilon_1 \tag{31}$$

The vector $(c_0, c_1)$ is called the "effective bandwidth vector" of the traffic source.

Assuming that $B_0$ and $B_1$ are such that $c_0$ and $c_1$ satisfy inequalities (30), equations (24) and (25) assure that such values of $B_0$, $B_1$ exist, so long as equation (24) is satisfied. Equation (32) is quadratic in c and can be solved directly to obtain $$c_1 = f\left(\lambda_0 + \lambda_1, \frac{B_1}{\log \epsilon_1}\right) \tag{32}$$

where $$f(\lambda, \gamma) = \frac{1}{2} [\lambda + (\alpha + \beta)\gamma + \sqrt{(\lambda + (\alpha + \beta)\gamma)^2 - 4\alpha\lambda\gamma}] \tag{33}$$

and $\lambda = \lambda_0 + \lambda_1$ and $$\gamma = \frac{B_1}{\log \epsilon_1}$$

for $\lambda \geq 0$, $\gamma \leq 0$. The positive radical is chosen to avoid a negative bandwidth. Solving equation (31) for $c_0$, although feasible, is difficult since equation (31) is cubic in c. Since $\delta_1 B_1$ and $\delta_0(B_0 - B_1)$ are both decreasing functions of c, it follows that the solution to the optimization problem is given by $$c = max(c_0, c_1) \tag{34}$$

Note that $c_0(\lambda) = f(\lambda, B_0/\log \epsilon_0)$ is the minimum channel capacity needed if there is no priority differentiation. Therefore, priority differentiation always produces saving, which can be defined as $c_0(\lambda) - c(\lambda_0)$. The extent of the bandwidth savings is dependent upon the traffic mix and other parameters. As $\lambda_0 \to \lambda$, i.e., as low priority traffic gets to be negligible, the savings drop to zero. However, as low priority traffic increases, the savings increase to a maximum of $f(\lambda, B_0/\log \epsilon_0) - f(\lambda, B_1/\log \epsilon_1)$. Therefore, in order to save the most on bandwidth, $B_1 < B_0(\log \epsilon_1/\log \epsilon_0)$. The effective bandwidth calculated by the optimization process of the present invention can save a significant portion of the required bandwidth reservations.

It is also possible to keep $B_0$ fixed and choose an optimum threshold value $B_1$ so that the channel capacity c needed to satisfy the quality of service requirements for the two-priority traffic is minimized. That is, assume that the source characteristics, the quality of service requirements and the buffer size are fixed, and solve the following optimization problem:

Minimize c

Subject to: $\delta_1 B_1 \leq \log \epsilon_1,$ (35)

$\delta_1 B_1 + \delta_0(B_0 - B_1) \leq \log \epsilon_0$ (36)

$$\lambda_0 \frac{\alpha}{\alpha + \beta} < c < \lambda_0 \tag{37}$$

$$0 \leq B_1 \leq B_0. \tag{38}$$

Using the effective bandwidths defined above $c_0(B_1) = c_0(B_0, B_1)$ and $c_1(B_1) = c_1(B_0, B_1)$, it can be seen that $c_1(B_1)$ is a decreasing function of $B_1$ and $c_0(B_1)$ is an increasing function of $B_1$. Since the effective bandwidth vector is given by $(c_0(B_1), c_1(B_1))$, the channel capacity that is required to satisfy the quality of service requirements for both priorities is minimized at the value $B_1^*$ of $B_1$ such that $c_0(B_1^*) = c_1(B_1^*) = c^*$. If $c = c^*$ and $B_1 = B_1^*$ simultaneously satisfy equations (30) and (31), then $B_1^*$ is the optimal threshold and $(c^*, c^*)$ is the corresponding optimal bandwidth vector.

An efficient method for obtaining $B_1^*$ follows. Since both of equations (30) and (31) must be satisfied simultaneously, equation (31) can be substituted in equation (30) to obtain $$\left( \frac{\alpha}{c} - \frac{\beta}{\lambda_0 - c} \right)(B_0 - B_1) = \log\epsilon_0 - \log\epsilon_1 = \log\frac{\epsilon_0}{\epsilon_1} \quad (39)$$

Equation (39) is quadratic in c and the solution is given by $$c(B_1) = f\left( \lambda_0, \frac{B_0 - B_1}{\log\epsilon_0 - \log\epsilon_1} \right) \quad (40)$$

The optimum value for the buffer threshold $B_1^*$ is the solution of $$f\left( \lambda_0 + \lambda_1, \frac{B_1^*}{\log\epsilon_1} \right) = f\left( \lambda_0, \frac{B_0 - B_1^*}{\log\epsilon_0 - \log\epsilon_1} \right) \quad (41)$$

Unfortunately, equation (41) cannot be solved for $B_1^*$ analytically. However, using $c_1(B_1)$ from equation (32) and $c(B_1)$ from equation (40), the value of $B_1^*$ can be computed numerically, for example, by using a binary search method.

$$\left( \frac{\alpha}{c} - \frac{\beta}{\lambda - c} \right) B_0 = \log\epsilon_0 \quad (42)$$

and hence the optimum bandwidth is given by $$c^* = f\left( \lambda, \frac{B_0}{\log\epsilon_0} \right) \quad (43)$$

and $$\frac{B_1^*}{B_0} = \frac{\log\epsilon_1}{\log\epsilon_0} \quad (44)$$

From these relationships, it can be seen that, as $\lambda_0$ decreases, $B_1^*$ increases, eventually becoming equal to $B_0$ when $\lambda_0 = f(\lambda, B_0/\log\epsilon_1)$. As $\lambda_0$ goes below $f(\lambda, B_0/\log\epsilon_1)$, $B_1^*$ stays at $B_0$ and $c^*$ stays at $f(\lambda, B_0/\log\epsilon_1)$, that is, the system is constrained more by the requirements of the type 1 traffic than by the requirements of the type 0 traffic. Moreover, if the high priority type 0 traffic is small compared to the type 1 traffic (e.g., layer-coded video traffic), the threshold $B_1$ should be placed close to $B_0$. In this case, the maximum savings in allocated bandwidth are realized, which can be quantified as $jf(\lambda, B_0/\log\epsilon_0) - f(\lambda, B_0/\log\epsilon_1)$.

It is also possible to consider both $B_0$ and $B_1$ as design variables and introduce yet other quality of service requirements such as a requirement that the maximum delay in the buffer be bounded by some constant d. The buffer size $B_0$ can then be interpreted as the buffer allocated for a given connection with the parameters ($\alpha$, $\beta$, $\lambda_0$, $\lambda_1$) and the quality of service requirements ($\epsilon_0$, $\epsilon_1$, d). The new optimization problem is given by Minimize c Subject To; $\delta_1 B_1 \leq \log\epsilon_1$ \quad (45)

$\delta_1 B_1 + \delta_0(B_0 - B_1) \leq \log\epsilon_0$ \quad (46)

$\lambda_0 \frac{\alpha}{\alpha + \beta} < c < \lambda_0$ \quad (47)

$0 \leq B_1 \leq B_0$ \quad (48)

$\frac{B_0}{c} \leq d.$ \quad (49)

The optimum buffer value is given as the solution to the equation $$B_0^* = d \times c^*(B_o^*) \quad (50)$$

where $c^*(B_0)$ can be computed from equations (48) and (33). Once $B_0^*$ is obtained from equation (57), then $B_1^*$ and $c^*$ can be obtained from equations (48) and (29), respectively.

Figure 5:
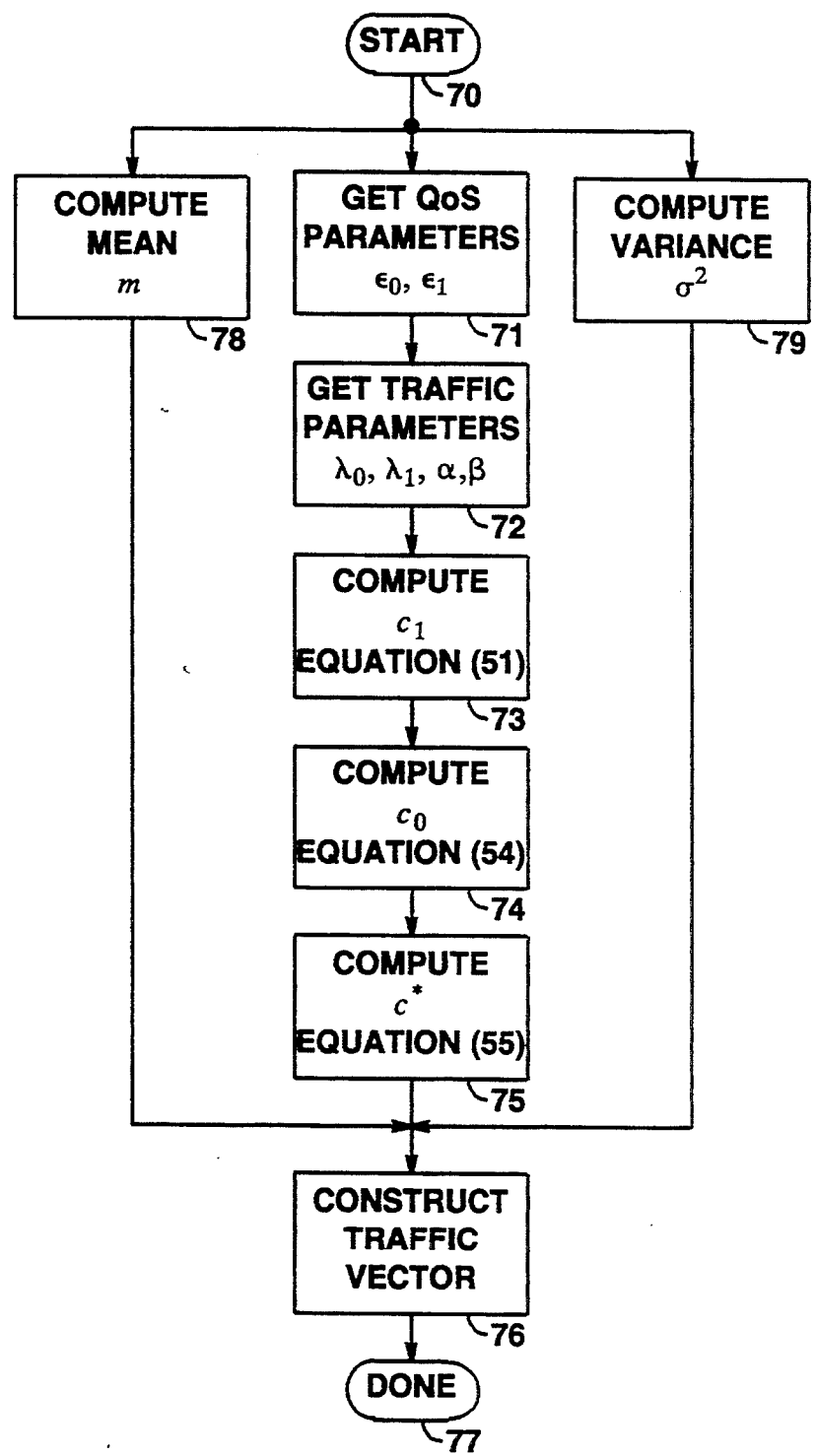
FIG. 5 shows a flow chart of the process for determining an optimum effective bandwidth for a multi-priority signal source for use in reserving a connection for that traffic on the packet communications network according to FIG. 1.

Referring now to FIG. 5, there is shown a detailed flow chart of the process for generating the optimum representation of the two-priority traffic arriving at box 49 of FIG. 4, utilizing the mathematical development detailed above, all in accordance with the present invention. Starting in start box 70, box 78 is entered to calculate the mean m of the two-priority traffic detected in box 50 of FIG. 4, directly from measurements or from a user specification. Similarly, box 79 is entered to calculate the variance $\sigma^2$ of the two-priority traffic directly from measurements or from the user specification. These values (m and $\sigma^2$) are combined in box 76 with an optimum effective channel capacity c to form an optimal vector representation of the two-priority traffic which can be used to calculate the route (in controller 37 of FIG. 3) and update the link metrics along the route (via the connection message of FIG. 2). The calculation of the optimal effective bandwidth c takes place in boxes 71 through 75 of FIG. 5.

In box 71, the desired quality of service parameters $\epsilon_0$ and $\epsilon_1$ are obtained from the source of this two-priority traffic. As noted above, $\epsilon_0$ is the desired maximum probability that high priority data will be lost and $\epsilon_1$ is the desired maximum probability that low priority data will be lost. In box 72, the traffic characterizing parameters $\lambda_0$, $\lambda_1$, $\alpha$, and $\beta$ are obtained from the source of the this two-priority traffic. $\lambda_0$ is the rate at which the high priority traffic generated, $\lambda_1$ is the rate at which the low priority traffic is generated, $1/\alpha$ is the average amount of time the two-priority traffic source stays off, assuming an $\exp(\alpha)$ exponential distribution, and $1/\beta$ is the average amount of time the two-priority traffic source stays on, assuming an $\exp(\beta)$ exponential distribution. In box 73, an effective bandwidth for low priority traffic is calculated according to the equation (33), repeated below:

$$c_1 = \frac{1}{2} [\lambda + (\alpha + \beta)\gamma + \sqrt{(\lambda + (\alpha + \beta)\gamma)^2 - 4\alpha\lambda\gamma}] \quad (51)$$

where $$\lambda = \lambda_0 + \lambda_1 \quad (52)$$

$$\gamma = \frac{B_1}{\log \epsilon_1} \tag{53}$$

and $B_1$ is the value of the buffer threshold which must not be exceeded to allow low priority traffic into the buffer.

Box 74 is then entered where an effective bandwidth for the high priority traffic is calculated as the maximum real root of equation (30), rewritten as the cubic equation $$c^3 \log \epsilon_0 + c^2[(2\lambda_0 + \lambda_1)\log\epsilon_0 - (\alpha - \beta)B_0] + c[\lambda_0((2\alpha+\beta)B_0 + \log\epsilon_0) + \lambda_1(\beta B_1 + (\alpha+\beta)B_0)] - \alpha(\lambda_0 + \lambda_1)\lambda_0 B_0 = 0 \tag{54}$$

where $B_0$ is the size of the buffer and $B_1$ is the threshold of the buffer which must not be exceeded to allow low priority traffic into the buffer. Box 75 is then entered where the optimum effective bandwidth c is selected as the maximum of $c_1$ and $c_2$ as calculated from equations (62) and (65), respectively, i.e.

$$c = \max(c_0, c_1) \tag{55}$$

As noted above, this optimum effective bandwidth c is combined in box 76 with the mean m and the variance $\pi^2$ of the two-priority source to produce a traffic vector which can be used to effectively manage the two-priority traffic in the packet network of FIG. 1. The process of FIG. 5 terminates in terminal box 77.

Figure 6:
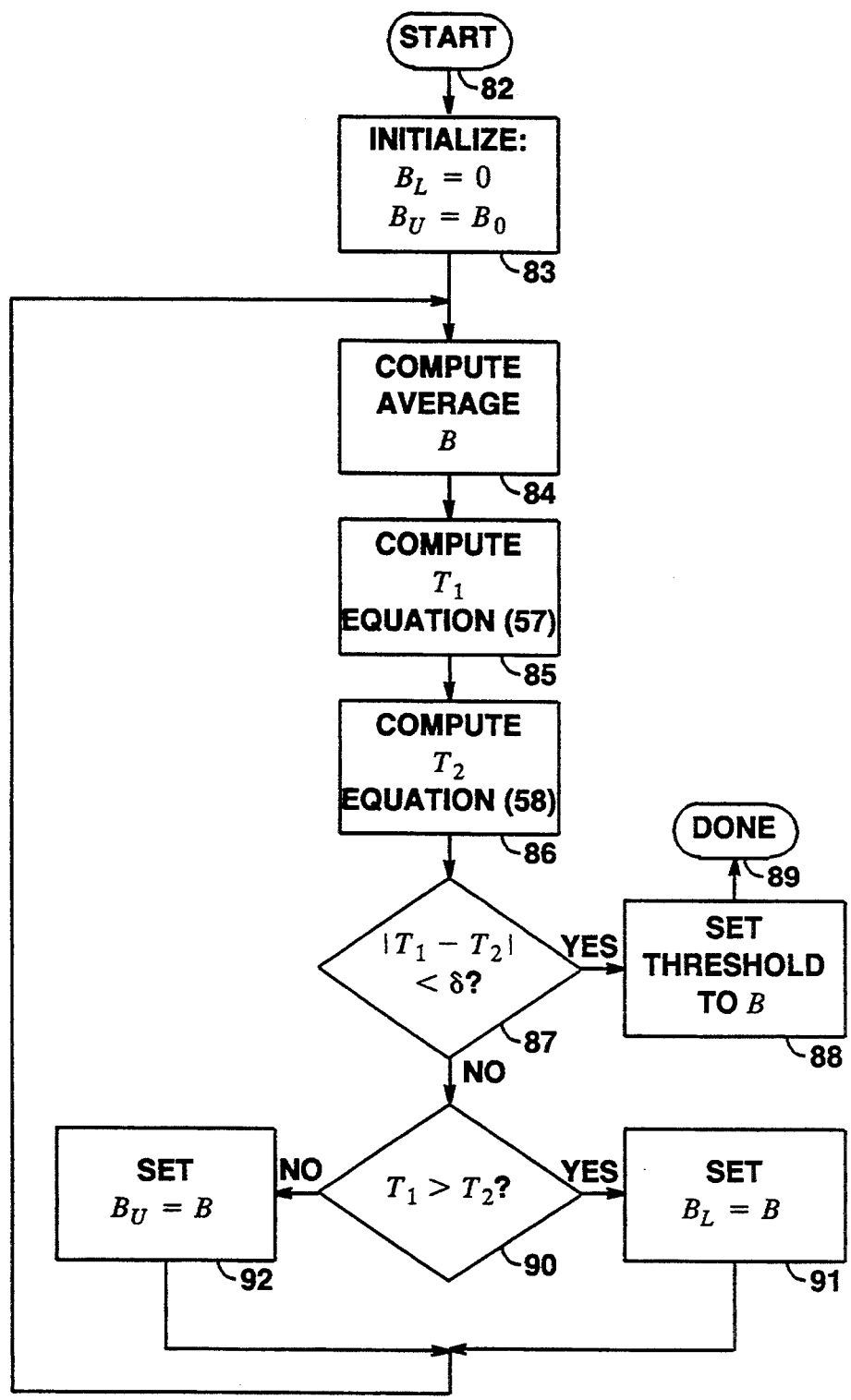
FIG. 6 shows a detailed flow chart of the process for determining an optimum acceptance threshold for a buffer storage mechanism which combines multi-priority traffic for transmission on the packet communications network of FIG. 1.

If it is assumed that the size $B_0$ of the buffer is fixed, possibly due to limitations on the physical realization of the buffer, FIG. 6 discloses a detailed flow chart for calculating an optimal threshold for the buffer which will simultaneously satisfy the quality of service requirements ($\epsilon_0$ and $\epsilon_1$) and yet provide a minimal effective bandwidth for carrying the two-priority traffic. As noted in connection with equation (41), the value of $B_1$ cannot be calculated analytically and hence must be approximated. The process of FIG. 6 approximates the value of the buffer threshold $B_1$ by using a binary search routine. More particularly, the process of FIG. 6 approximates the value of $B_1$ by using a previous estimate of the value of $B_1$ to calculate upper and lower bounds on the value of the effective bandwidth according to equation (33). The process is terminated when these bounds get sufficiently close to each that the absolute value of the difference is less than a pre-selected error margin $\delta$. The next estimate of the upper or lower bound is set to the previous average, depending on the sign of the difference between the upper and lower bounds of the effective bandwidth.

More particularly, starting at start box 82, box 83 is entered where the value of a lower limit $B_L$ of the buffer threshold is initialized at zero, and the value of an upper limit $B_U$ is initialized at the size of the buffer store $B_0$, i.e., the interval to be searched is $[0, B_0]$. Box 84 is then entered where the average B of the lower limit and upper limits of the threshold is generated, i.e.

$$B = \frac{B_L + B_U}{2} \tag{56}$$

The value of B is the current estimate of the ultimate value. On the first iteration, the value of B is one-half the size of the entire buffer. Successive values of this approximation will halve the search area, each time selecting the appropriate half to subdivide. Equation (34) is used to calculate the bandwidth required to satisfy this average value of B assuming first that the combined higher and lower priority traffic is present, and secondly, assuming that only the higher priority of traffic is present. The appropriate value of B would produce a bandwidth somewhere between these two values. If the combined higher and lower priority bandwidth value is greater, the new lower bound is set at the old average value and the process iterated. If the higher priority value is greater, the new upper bound is set at the old average value and the process iterated. The process terminates when the two values are sufficiently close to each other.

Returning to FIG. 6, after computing the average in box 84, box 85 is then entered where a first temporary variable $T_1$ is calculated according to the formula $$T_1 = \frac{1}{2}[\lambda + (\alpha + \beta)\gamma + \sqrt{(\lambda + (\alpha + \beta)\gamma)^2 - 4\alpha\lambda\gamma}\,] \tag{57}$$

where $\lambda = \lambda_0 + \lambda_1$ and $$\gamma = \frac{B}{\log \epsilon_1}.$$

Box 86 is then entered where a second temporary variable $T_2$ is calculated according to the same formula $$T_2 = \frac{1}{2}[\lambda + (\alpha + \beta)\gamma + \sqrt{(\lambda + (\alpha + \beta)\gamma)^2 - 4\alpha\lambda\gamma}\,] \tag{58}$$

but where $\lambda = \lambda_0$ and $$\gamma = \frac{B_0 - B}{\log \epsilon_0 - \log \epsilon_1}.$$

As noted above, the values of $T_1$ and $T_2$ represent the optimum values of the bandwidth required for the low priority packets and for the high priority packets, respectively. Decision box 87 is entered where it is determined whether the upper and lower bounds $T_1$ and $T_2$ are sufficiently close together to terminate the approximation process. That is, it is determined if $$|T_1 - T_2| < \delta \tag{59}$$

where $\delta$ is a pre-selected small error level. If it is determined that the absolute value of this difference is less than the error level, box 88 is entered, where the threshold value $B_1$ is set at the current average value B. If the actual error level exceeds the desired error level, decision box 90 is entered to determine if the combined priority optimum bandwidth exceeds the high priority bandwidth. If so, the new upper bound is set at the previous average value B in box 92. If the high priority optimum bandwidth is higher, the new lower bound is set at the previous average value B in box 91. In either event, box 84 is re-entered to recalculate a new average (box 84), and then to calculate new bandwidths (boxes 68 and 69). This process is iterated until the high priority and low priority bandwidths converge sufficiently closely to make the difference less than the desired error level, as determine in box 87. The process then terminates in boxes 88 and 89.

The processes of FIGS. 5 and 6 provide optimum values for both the effective bandwidth c of the two-priority source and the threshold $B_1$ of buffer 53, values that ensure satisfaction of the quality of service requirements for the signals at the very minimum reserved bandwidth on the facilities of the network of FIG. 1. These optimum values permit significantly more efficient exploitation of the available bandwidth in the network of FIG. 1.

What is claimed is:

1. A packet communications network comprising
  a plurality of switching nodes interconnected by a larger plurality of transmission links,
  at least one source of traffic connected to one of said nodes and producing data packets having differing quality of service requirements,
  a data buffer in said one of said nodes,
  means for accepting data packets into said network with a first quality of service requirement only if the occupancy of said data buffer is less than a pre-defined threshold defined for said first quality of service requirement;
  means for characterizing said traffic from said source by an effective bandwidth which simultaneously satisfies said quality of service requirements for all of said packets having different quality of service requirements,
  means for reserving a connection through said network for said traffic having a bandwidth equal to said effective bandwidth;
  means for transmitting the combined data stream from said data buffer on said connection through said network; and
  means for selecting said pre-defined threshold such that the bandwidth required to meet all of said quality of service requirements is minimized.

2. The packet communications network according to claim 1 further comprising
  means for minimizing said effective bandwidth.

3. The packet communications network according to claim 1 further comprising
  means for generating a traffic vector including said effective bandwidth and the mean and variance of said traffic from said at least one source; and
  means for utilizing said traffic vector for reserving said connection.

4. The packet communications network according to claim 3 further comprising
  means for adding said traffic vector to the link traffic vector for each link in said connection when said connection is set up; and
  means for subtracting said traffic vector from the link traffic vector for each link in said connection when said connection is taken down.

5. The packet communications network according to claim 2 further comprising
  means for determining the effective bandwidth $c_1$ for one of said data packets having a first quality of service requirement in accordance with the relationship $$c_1 = \frac{1}{2} [\lambda + (\alpha + \beta)\gamma + \sqrt{(\lambda + (\alpha + \beta)\gamma)^2 - 4\alpha\lambda\gamma}\ ]$$

where $\lambda = \lambda_0 + \lambda_1;$ $\gamma = \frac{B_1}{\log\epsilon_1};$ $\lambda_0$ is the rate at which a second different quality of service data packets are produced;
$\lambda_1$ is the rate at which said first quality of service data packets are produced;
$B_1$ is said pre-defined threshold;
$\epsilon_1$ is the desired probability of loss of said first quality of service data packets;
$\alpha$ is the average amount of time said source of traffic stays off, assuming an $\exp(\alpha)$ exponential distribution of said times;
$\beta$ is the average amount of time said source of traffic stays on, assuming an $\exp(\beta)$ exponential distribution of said times;
means for determining the effective bandwidth $c_0$ for data packets having said second quality of service requirement, where $c_0$ is the maximum real root of the cubic equation $$c^3\log\epsilon_0 + c^2[(2\lambda_0 + \lambda_1)\log\epsilon_0 - (\alpha - \beta)B_0] +$$
$$c[\lambda_0((2\alpha + \beta)B_0 + \log\epsilon_0) + \lambda_1(\beta B_1 + \alpha + \beta)B_0 -$$
$$\alpha(\lambda_{01} + \lambda_1)\lambda_0 B_0 = 0$$

where
  $\epsilon_0$ is the probability of loss of packets with said second quality of service requirements;
  $B_0$ is the size of said data buffer; and
  means for utilizing the maximum of $c_1$ and $c_0$ as said effective bandwidth.

6. The packet communications network according to claim 1 further comprising
  binary searching means for determining the size of said pre-determined threshold, said binary search means comprising
  means for initializing the upper and lower bounds on said threshold at the size $B_0$ of said data buffer and zero;
  means for determining the average B of said upper and lower bounds on said threshold;
  means for determining a temporary variable $T_1$ according to the formula $$T_1 = \frac{1}{2} [\lambda + (\alpha + \beta)\gamma + \sqrt{(\lambda + (\alpha + \beta)\gamma)^2 - 4\alpha\lambda\gamma}\ ]$$

where $\lambda = \lambda_0 + \lambda_1;$ $\gamma = \frac{B}{\log\epsilon_1};$ $\lambda_0$ is the rate at which a second quality of service data packets are produced;
$\lambda_1$ is the rate at which said first quality of service data packets are produced;
$\epsilon_1$ is the desired probability of loss of said first quality of service data packets;
$\alpha$ is the average amount of time said source of traffic stays off, assuming and $\exp(\alpha)$ exponential distribution of said times;
$\beta$ is the average amount of time said source of traffic stays off, assuming an $\exp(\beta)$ exponential distribution of said times;

means for determining a second temporary variable $T_2$ according to the formula $$T_2 = \frac{1}{2} [\lambda + (\alpha + \beta)\gamma + \sqrt{(\lambda + (\alpha + \beta)\gamma)^2 - 4\alpha\lambda\gamma}\,]$$

where $\lambda = \lambda_0;$ $\gamma = \dfrac{B_0 - B}{\log\epsilon_0 - \log\epsilon_1};$ $\lambda_0$ is the rate at which said second quality of service data packets are produced;

$\epsilon_0$ is the desired probability of loss of said second quality of service data packets;

$\alpha$ is the average amount of time said source of traffic stays off, assuming an $\exp(\alpha)$ exponential distribution of said times;

$\beta$ is the average amount of time said source of traffic stays on, assuming an $\exp(\beta)$ exponential distribution of said times;

means for utilizing said average value as said threshold value when the difference between said temporary variables $T_1$ and $T_2$ is less than a pre-selected error value;

means for setting said lower value of said threshold at said average value when said first temporary variable $T_1$ is greater than said second temporary variable $T_2$ and said difference is not less than said pre-selected error value;

means for setting said upper value of said threshold at said average value when said first temporary variable $T_1$ is not greater than said second temporary variable $T_2$ and said difference is not less than said pre-selected error value; and means for re-determining said average B of said upper and lower bounds, for re-comparing said first and second temporary variables $T_1$ and $T_2$, and for readjusting said upper or lower bounds when said difference is not less than said pre-selected error value.

7. A method for operating a packet communications network comprising the steps of
interconnecting a plurality of switching nodes by a larger plurality of transmission links,
connecting at least one source of traffic to one of said nodes, said source producing data packets having differing quality of service requirements,
admitting data packets with a first quality of service requirement to a data buffer only if the occupancy of said data buffer is less than a pre-defined threshold defined for said given quality of service requirement;
characterizing said traffic from said source by an effective bandwidth which simultaneously satisfies said quality of service requirements for said packets having different quality of service requirements,
reserving a connection through said network for said traffic having a bandwidth equal to said effective bandwidth;
transmitting the data stream from said data buffer on said connection through said network; and
selecting said pre-defined threshold such that the bandwidths required to meet all of said quality of service requirements individually are equal to each other.

8. The method according to claim 7 further comprising the step of minimizing said effective bandwidth.

9. The method according to claim 7 further comprising the steps of
generating a traffic vector including said effective bandwidth and the mean and variance of said traffic from said at least one source; and
utilizing said traffic vector for reserving said connection.

10. The method according to claim 9 further comprising the steps of
adding said traffic vector to the link traffic vector for each link in said connection when said connection is set up; and
subtracting said traffic vector from the link traffic vector for each link in said connection when said connection is taken down.

11. The method according to claim 8 further comprising the steps of
determining the effective bandwidth $c_1$ for one of said data sources having a first quality of service requirement in accordance with the relationship $$c_1 = \frac{1}{2}[\lambda + (\alpha + \beta)\gamma + \sqrt{(\lambda + (\alpha + \beta)\gamma)^2 - 4\alpha\lambda\gamma}\,]$$

where $\lambda = \lambda_0 + \lambda_1;$ $\gamma = \dfrac{B_1}{\log\epsilon_1};$ $\lambda_0$ is the rate at which a second different quality of service data packets are produced;

$\lambda_1$ is the rate at which said first quality of service data packets are produced;

$B_1$ is said pre-defined threshold;

$\epsilon_1$ is the desired probability of loss of said first quality of service data packets;

$\alpha$ is the average amount of time said source of traffic stays off, assuming an $\exp(\alpha)$ exponential distribution of said times;

$\beta$ is the average amount of time said source of traffic stays on, assuming an $\exp(\beta)$ exponential distribution of said times;

determining the effective bandwidth $c_0$ for another of said data packets having a second quality of service requirement, where $c_0$ is the maximum real root of the cubic equation $$c^3\log\epsilon_0 + c^2[(2\lambda_0 + \lambda_1)\log\epsilon_0 - (\alpha - \beta)B_0] +$$
$$c[\lambda_0((2\alpha + \beta)B_0 + \log\epsilon_0) + \lambda_1(\beta B_1 + (\alpha + \beta)B_0) -$$
$$\alpha(\lambda_0 + \lambda_1)\lambda_0 B_0 = 0$$

where $\epsilon_0$ is the probability of loss of packets of said second quality of service requirements;

$B_0$ is the size of said data buffer; and means for utilizing the maximum of $c_1$ and $c_0$ as said effective bandwidth.

12. The method according to claim 8 further comprising the steps of
utilizing binary searching means for said step of determining the size of said pre-determined threshold, said step of utilizing binary search means comprising the steps of initializing the upper and lower bounds on said threshold at the size $B_0$ of said data buffer and zero;

determining the average B of said upper and lower bounds on said threshold;

determining a temporary variable $T_1$ according to the formula $$T_1 = \frac{1}{2}[\lambda + (\alpha + \beta)\gamma + \sqrt{(\lambda + (\alpha + \beta)\gamma)^2 - 4\alpha\lambda\gamma}\,]$$

where $\lambda = \lambda_0 + \lambda_1$;

$\gamma = \dfrac{B}{\log \epsilon_1}$;

$\lambda_0$ is the rate at which a second quality of service data packets are produced;

$\lambda_1$ is the rate at which said first quality of service data packets are produced;

$\epsilon_1$ is the desired probability of loss of said first quality of service data packets;

$\alpha$ is the average amount of time said source of traffic stays off, assuming an $\exp(\alpha)$ exponential distribution of said times;

$\beta$ is the average amount of time said source of traffic stays on, assuming an $\exp(\beta)$ exponential distribution of said times;

determining a second temporary variable $T_2$ according to the formula $$T_2 = \frac{1}{2}[\lambda + (\alpha + \beta)\gamma + \sqrt{(\lambda + (\alpha + \beta)\gamma)^2 - 4\alpha\lambda\gamma}\,]$$

where $\lambda = \lambda_0$;

$\gamma = \dfrac{B_0 - B}{\log \epsilon_0 - \log \epsilon_1}$;

$\lambda_0$ is the rate at which said second quality of service data packets are produced;

$\epsilon_0$ is the desired probability of loss of said second quality of service data packets;

$\alpha$ is the average amount of time said source of traffic stays off, assuming an $\exp(\alpha)$ exponential distribution of said times;

$\beta$ is the average amount of time said source of traffic stays on, assuming an $\exp(\beta)$ exponential distribution of said times;

utilizing said average value as said threshold value when the difference between said temporary variables $T_1$ and $T_2$ is less than a pre-selected error value;

setting said lower value of said threshold at said average value when said first temporary variable $T_1$ is greater than said second temporary variable $T_2$ and said difference is not less than said pre-selected error value;

setting said upper value of said threshold at said average value when said first temporary variable $T_1$ is not greater than said second temporary variable $T_2$ and said difference is not less than said pre-selected error value; and re-determining said average B of said upper and lower bounds, re-comparing said first and second temporary variables $T_1$ and $T_2$, and readjusting said upper or lower bounds when said difference is not less than said pre-selected error value.

13. An access node in a packet communications network comprising means for connecting at least one source of traffic to said access nodes, said source producing data packets having differing quality of service requirements, a data buffer, means for combining said data packets into a single data stream by selectively introducing packets from each of said source of traffic into said data buffer, said means for combining data packets including means for admitting data packets with a first quality of service requirement only if the occupancy of said data buffer is less than a pre-defined threshold defined for said first quality of service requirement;

means for characterizing said traffic from said source by an effective bandwidth which simultaneously satisfies said quality of service requirements for said packets having different quality of service requirements, means for transmitting a request for reserving a connection through said network for said traffic having a bandwidth equal to said effective bandwidth;

means for transmitting the combined data stream from said data buffer into said network; and means for selecting said pre-defined threshold such that the bandwidth required to meet all of said quality of service requirements is minimized.

14. The access node according to claim 13 further comprising means for minimizing said effective bandwidth.

15. The access node according to claim 13 further comprising means for generating a traffic vector including said effective bandwidth and the mean and variance of said traffic from said at least one source; and means for utilizing said traffic vector for reserving said connection.

16. The access node according to claim 15 further comprising means for adding said traffic vector to the link traffic vector for each link in said connection when said connection is set up; and means for subtracting said traffic vector from the link traffic vector for each link in said connection when said connection is taken down.

17. The access node according to claim 14 further comprising means for determining the effective bandwidth $c_1$ for one of said data sources having a first quality of service requirement in accordance with the relationship $$c_1 = \frac{1}{2}[\lambda + (\alpha + \beta)\gamma + \sqrt{(\lambda + (\alpha + \beta)\gamma)^2 - 4\alpha\lambda\gamma}\,]$$

where $\lambda = \lambda_0 + \lambda_1$;

$\gamma = \dfrac{B_1}{\log \epsilon_1}$;

$\lambda_0$ is the rate at which a second different quality of service data packets are produced;

$\lambda_1$ is the rate at which said first quality of service data packets are produced;

$B_1$ is said pre-defined threshold;

$\epsilon_1$ is the desired probability of loss of said first quality of service data packets;

$\alpha$ is the average amount of time said source of traffic stays off, assuming an $\exp(\alpha)$ exponential distribution of said times; and $\beta$ is the average amount of time and source of traffic stays on, assuming an $\exp(\beta)$ exponential distribution of said times;

means for determining the effective bandwidth $c_0$ for another of said data packets having a second quality of service requirement, where $c_0$ is the maximum real root of the cubic equation $$c^3 \log\epsilon_0 + c^2[(2\lambda_0 + \lambda_1)\log\epsilon_0 - (\alpha - \beta)] +$$
$$c[\lambda_0((2\alpha + \beta)B_0 + \log\epsilon_0) + \lambda_1(\beta B_1 + (\alpha + \beta)B_0) -$$
$$\alpha(\lambda_0 + \lambda_1)\lambda_0 B_0 = 0$$

where $\epsilon_0$ is the probability of loss of packets of said second quality of service requirements;

$B_0$ is the size of said data buffer; and means for utilizing the maximum of $c_1$ and $c_0$ as said effective bandwidth.

18. The packet communications network according to claim 13 further comprising binary searching means for determining the size of said pre-determined threshold, said binary search means comprising means for initializing the upper and lower bounds on said threshold at the size $B_0$ of said data buffer and zero;

means for determining the average B of said upper and lower bounds on said threshold;

means for determining a temporary variable $T_1$ according to the formula $$T_1 = \frac{1}{2} [\lambda + (\alpha + \beta)\gamma + \sqrt{(\lambda + (\alpha + \beta)\gamma)^2 - 4\alpha\lambda\gamma} \,]$$

where $\lambda = \lambda_0 + \lambda_1$;

$\gamma = \frac{B}{\log\epsilon_1}$;

$\lambda_0$ is the rate at which a second quality of service data packets are produced;

$\lambda_1$ is the rate at which said first quality of service data packets are produced;

$\epsilon_1$ is the desired probability of loss of said first quality of service data packets;

$\alpha$ is the average amount of time said source of traffic stays off, assuming an $\exp(\alpha)$ exponential distribution of said times; and $\beta$ is the average amount of time said source of traffic stays on, assuming an $\exp(\beta)$ exponential distribution of said times;

means for determining a second temporary variable $T_2$ according to the formula $$T_2 = \frac{1}{2} [\lambda + (\alpha + \beta)\gamma + \sqrt{(\lambda + (\alpha + \beta)\gamma)^2 - 4\alpha\lambda\gamma} \,]$$

where $\lambda = \lambda_0$;

$\gamma = \frac{B_0 - B}{\log\epsilon_0 - \log\epsilon_1}$;

$\lambda_0$ is the rate at which said second quality of service data packets are produced;

$\epsilon_0$ is the desired probability of loss of said second quality of service data packets;

$\alpha$ is the average amount of time said source of traffic stays off, assuming an $\exp(\alpha)$ exponential distribution of said times; and $\beta$ is the average amount of time said source of traffic stays on, assuming an $\exp(\beta)$ exponential distribution of said times;

means for utilizing said average value as said threshold value when the difference between said temporary variables $T_1$ and $T_2$ is less than a pre-selected error value;

means for setting said lower value of said threshold at said average value when said first temporary variable $T_1$ is greater than said second temporary variable $T_2$ and said difference is not less than said pre-selected error value;

means for setting said upper value of said threshold at said average value when said first temporary variable $T_1$ is not greater than said second temporary variable $T_2$ and said difference is not less than said pre-selected error value; and means for re-determining said average B of said upper and lower bounds, for re-comparing said first and second temporary variables $T_1$ and $T_2$, and for readjusting said upper or lower bounds when said difference is not less than said pre-selected error value.

* * * * *